Figure 1:
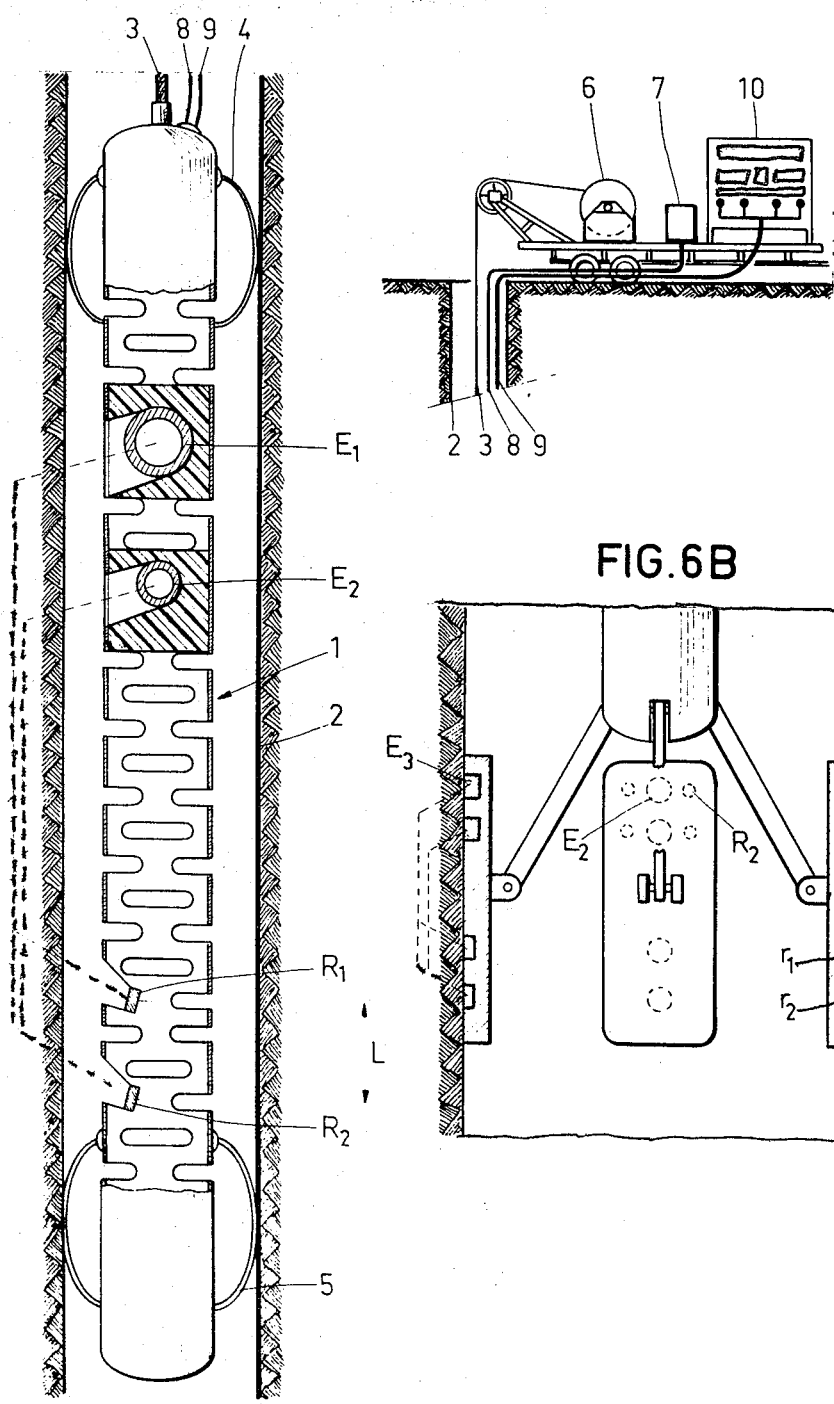

United States Patent [19]
Desbrandes

[11] 3,781,784
[45] Dec. 25, 1973

[54] METHOD AND DEVICES FOR DETERMINING CHARACTERISTICS OF GEOLOGICAL FORMATIONS BY TRANSMISSION OF ACOUSTIC SIGNALS

[75] Inventor: Robert Desbrandes, Sevres, France

[73] Assignee: Institut Francais Du Petrole Des Carburants Et Lubrifiants, Rueil-Malmaison, France

[22] Filed: July 5, 1972

[21] Appl. No.: 269,051

[52] U.S. Cl. .................................. 340/15.5 AC
[51] Int. Cl. ............................................. G01v 1/40
[58] Field of Search ....................... 340/15.5 AC; 181/.5 FS

[56] References Cited
UNITED STATES PATENTS
3,270,316   8/1966   Walker et al. ............... 340/15.5 AC
3,292,143   12/1966   Russell ........................... 181/.5 FS

*Primary Examiner*—Benjamin A. Borchelt
*Assistant Examiner*—N. Moskowitz
*Attorney*—Paul M. Craig, Jr. et al.

[57] ABSTRACT

A method wherein the attenuation of an acoustic wave between two receivers is expressed in the form $$\delta = \delta_g + Af^{1/3} + Bf + Cf^2 + N_1 f^3 + N_2 f^4 + \ldots + N_i f^{i+2}$$

and wherein there is determined at least one of the coefficients $\delta_g$ (geometrical attenuation), A (attenuation due to the movements of the fluids through the pores of the geological formations), B (attenuation due to the friction between solids), C (attenuation due to the friction between fluids), $N_1, N_2 \ldots N_i$ (attenuations which are functions of the frequency of the transmitted acoustic signals).

This determination is effected by measuring different values of $\delta$, corresponding to the transmission of different acoustic signals having different frequencies, the number of measurements performed at each level in the borehole being at least equal to the number of the above-defined coefficients to be determined.

7 Claims, 15 Drawing Figures

METHOD AND DEVICES FOR DETERMINING CHARACTERISTICS OF GEOLOGICAL FORMATIONS BY TRANSMISSION OF ACOUSTIC SIGNALS

The present invention relates to a method and to devices for determining characteristics of geological formations through transmission of acoustic signals.

The object of the method according to the invention, based on the attenuation of acoustic signals travelling through the studied formations is to isolate a first factor of this attenuation, which is independent of the frequency of the transmitted acoustic signals, this first factor being mainly a function of the geometry of the formations traversed by the borehole, i.e., of the bedding, fractures and cracks, and at least a second factor related to the characteristics of the formation and representative of the influence of the frequency of transmission on the attenuation of the acoustic signals.

The method according to the invention using data processing means, comprises the steps of transmitting acoustic signals through the studied geological formation, these signals travelling through the formation, measuring the attenuation of these signals between two points spaced from each other along the direction of propagation of these signals, this attenuation being a function $\delta$ of the logarithm of the ratio of the squares of the amplitudes of the signals appearing at said two points respectively, expressed by the relationship:

$$\delta = \delta_g + Af^{1/3} + Bf + Cf^2 + N_1f^3 + N_2f^4 + \ldots + N_if^{i+2}$$

wherein $\delta g$ is the geometrical attenuation factor which depends, in particular, on the degree of fracturation of the formation, A is the attenuation coefficient due to the movement or flow of the fluids through the pores of the formation and which depends on characteristics parameters of the porous medium and on the fluids impregnating the same, B is the attenuation coefficient due to the frictions between solids during the propagation of the acoustic signals. This coefficient is significant specially for clayish formations.

This parameter is thus representative of the compactness or impermeability of the formations traversed by the acoustic signals.

C represents the attenuation coefficient due to the frictions between fluids, this coefficient being very small for the porous formations which are usually traversed by boreholes.

The series of the terms $N_1f^3, N_2f^4 \ldots N_if^{i+2}$ represents all the attenuation factors which are respectively functions of $f^3, f^4 \ldots f^{i+2}$.

These coefficients are generally negligible for the formations traversed by a borehole; $f$ is the frequency of the transmitted acoustic signals.

The method according to the invention comprises the steps of transmitting signals having at least two frequencies $f_1, f_2 \ldots f_{i+4}$, the number of the transmission frequencies being at least equal to the number of parameters $\delta g$, A, B, C, $N_1 \ldots N_i$ to be determined, measuring the attenuation $\delta_1, \delta_2 \ldots \delta_{i+4}$ of the signals between said two points spaced from each other along the direction of propagation of the acoustic signals for each of said transmission frequencies, and determining, through data processing means, the values of at least the two first of said parameters $\delta g$, A, B and C complying with the relationships:

$$\delta_1 = \delta_g + Af_1^{1/3} + Bf_1 + Cf_1^2 + N_1f_1^3 + \ldots + N_if_1^{i+2}$$
$$\delta_2 = \delta_g + Af_2^{1/3} + Bf_2 + Cf_2^2 + N_1f_2^3 + \ldots N_if_2^{i+2}$$

$$\delta_{i+4} = \delta g + A f_{i+4}^{1/3} + Bf_{i+4} + Cf_{i+4}^2 + N_1f_{i+4}^3 + \ldots + N_if_{i+4}^{i+2}$$

The values of B, C. $N_1 \ldots N_i$ being considered as equal to zero when only two frequencies are used for the transmission and the values of C, $N_1 \ldots N_i$ being considered as equal to zero when the number of transmission frequencies is equal to three.

A device for carrying out the invention comprises, in combination, means for transmitting signals in a studied geological formation, these signals travelling through the formation, means for measuring the attenuation of these signals between two points, spaced from each other along the direction of propagation of these signals, this attenuation being a function $\delta$ of the logarithm of the ratio of the squares of the amplitudes of the signals appearing at said two points respectively, with $$\delta = \delta g + Af^{1/3} + Bf + Cf^2 + N_1f^3 + N_2f^4 + \ldots + N_if^{i+2}$$

wherein $\delta g$ is the geometrical attenuation factor which depends, in particular, on the degree of fracturation of the formation, A is the attenuation coefficient due to the movement or flow of the fluids through the pores of the formation and which depends of characteristics parameters of the porous medium and of the fluids impregnating the same, B is the attenuation coefficient due to the frictions between solids during the propagation of the acoustic signals. This coefficient is significant specially for clayish formations.

This parameter is thus representative of the compactness of impermeability of the formations traversed by the acoustic signals.

C represents the attenuation coefficient due to the frictions between fluids, this coefficient being very small for the porous formations which are usually traversed by boreholes.

The series of the terms $N_1f^3, N_2f^4 \ldots N_if^{i+2}$ represents all the attenuation factors which are respectively functions of $f^3, f^4 \ldots f^{i+2}$.

These coefficients are generally negligible for the formations traversed by a borehole, $f$ is the frequency of the transmitted acoustic signals.

Said transmission means have at least two transmission frequencies $f_1, f_2 \ldots f_{i+4}$, the number of the transmission frequencies being at least equal to the number of parameters $\delta g$, A, B, C, $N_1 \ldots N_i$ to be determined, data means being used to determine the values of at least the two first of said parameters $\delta g$, A, B and C complying with the relationships:

$$\delta_1 = \delta g + Af_1^{1/3} + Bf_1 + Cf_1^2 + N_1F_1^3 + \ldots + N_if_1^{i+2}$$
$$\delta_2 = \delta g + Af_2^{1/3} + Bf_2 + Cf_2^2 + N_1f_2^3 + \ldots + N_if_2^{i+2}$$

$$\delta_{i+4} = \delta g + A f_{i+4}^{1/3} + B f_{i+4} + C f^2_{i+4} + N_1 f_{i+4}^3 + \ldots + N_i f_{i+4}^{i+2}$$

$\delta_1, \delta_2 \ldots \delta_{i+4}$ being the attenuations measured for the transmission frequencies $f_1, f_2 \ldots f_{i+4}$ respectively, the values of B, C, $N_1 \ldots N_i$ being considered as equal to zero when only two frequencies are used for the transmission and the values of C, $N_1 \ldots N_i$ being considered as equal to zero when the number of transmission frequencies is equal to three.

The frequencies of the transmitted acoustic signals will be for example, in the range of from 5 kHz to 150 kHz. The transmitted acoustic signals should have a pseudo-period which is as steady as possible, so that the transmission frequencies $f_1, f_2 \ldots f_{i+4}$ be well defined.

The method according to the invention can be used indifferently for processing compressional, shear or surface acoustic waves. Of course the value of the determined attenuation coefficients will be different according to the type of acoustic waves employed, in view of their different ways of propagation.

It should be remembered that by the term "compressional waves" it is meant the waves or wave components whose direction of vibration is substantially parallel to the direction of propagation, by "shear or transverse waves," the waves or wave components producing vibrations of the formations in a direction substantially perpendicular to their direction of propagation, and by "surface waves," the waves of the "transverse" type travelling close to the borehole walls and having an amplitude exponentially decreasing with the distance from the borehole walls.

Figure 2:
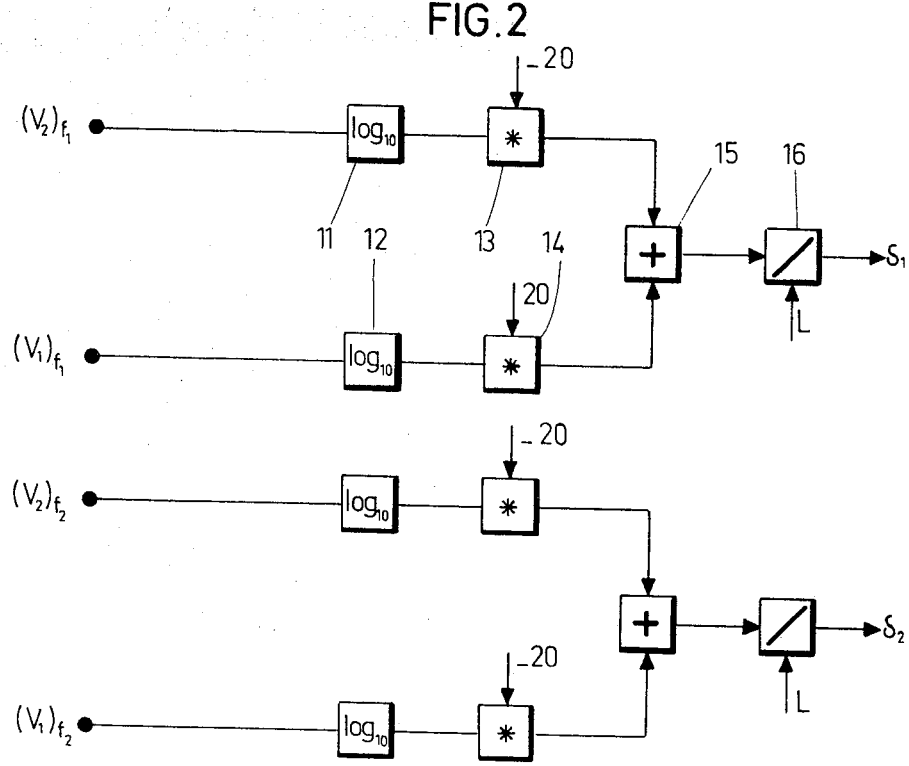
Figure 5:
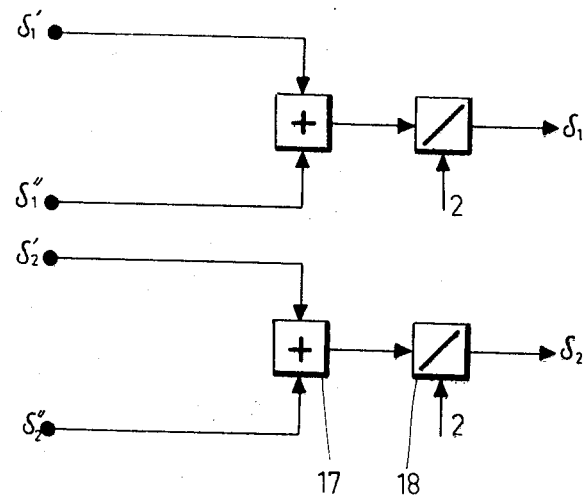
Figure 3:
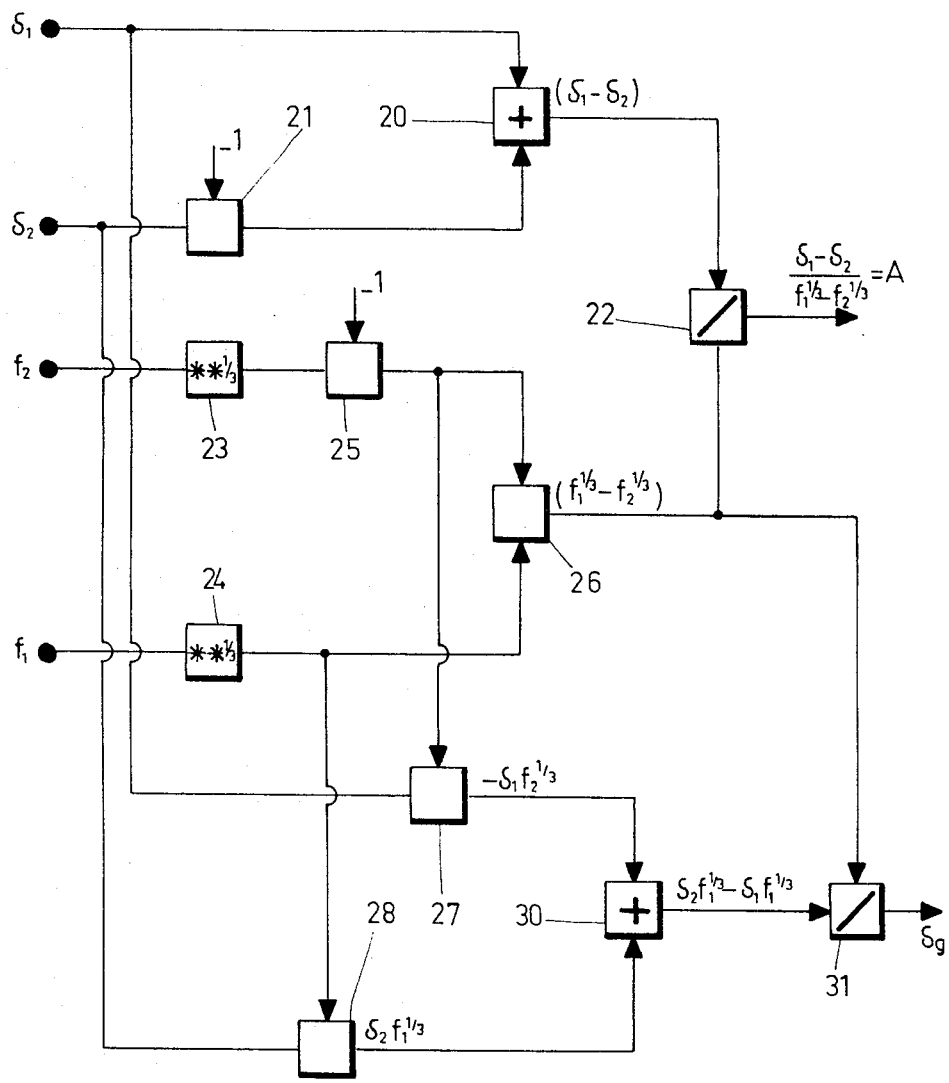
Figure 7:
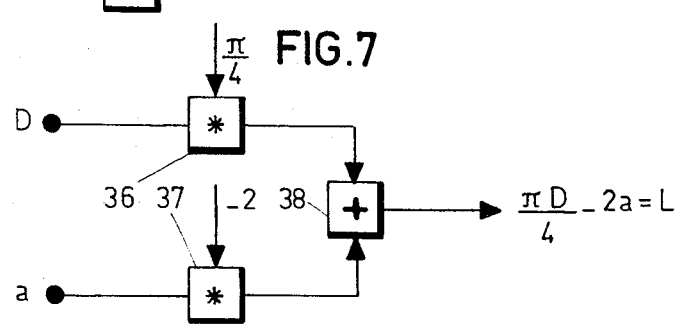
Figure 4:
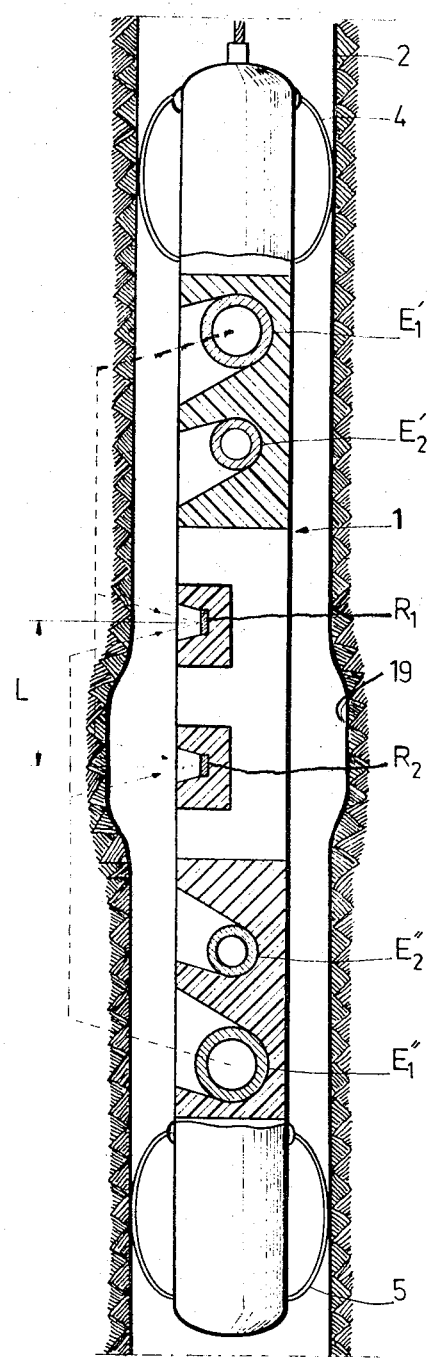
Figure 5A:
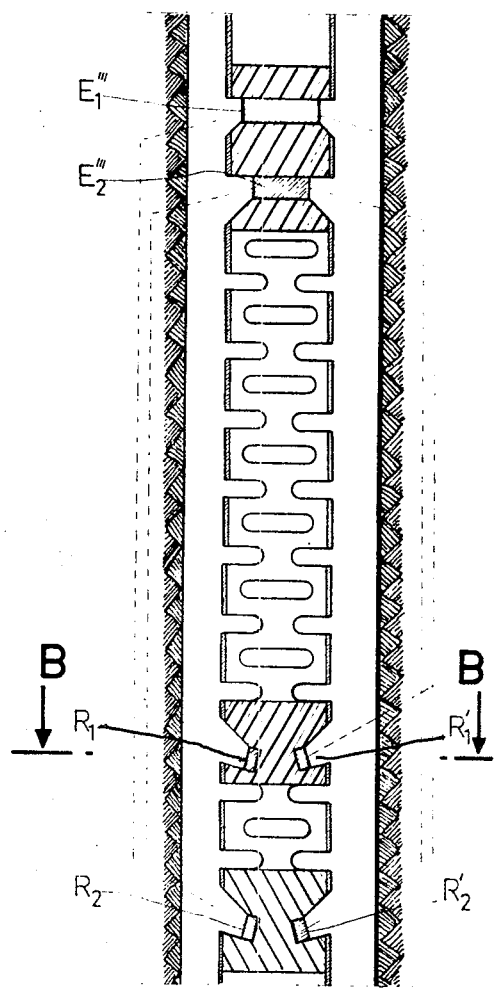
Figure 5B:
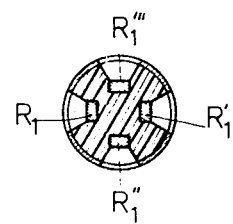
Figure 6:
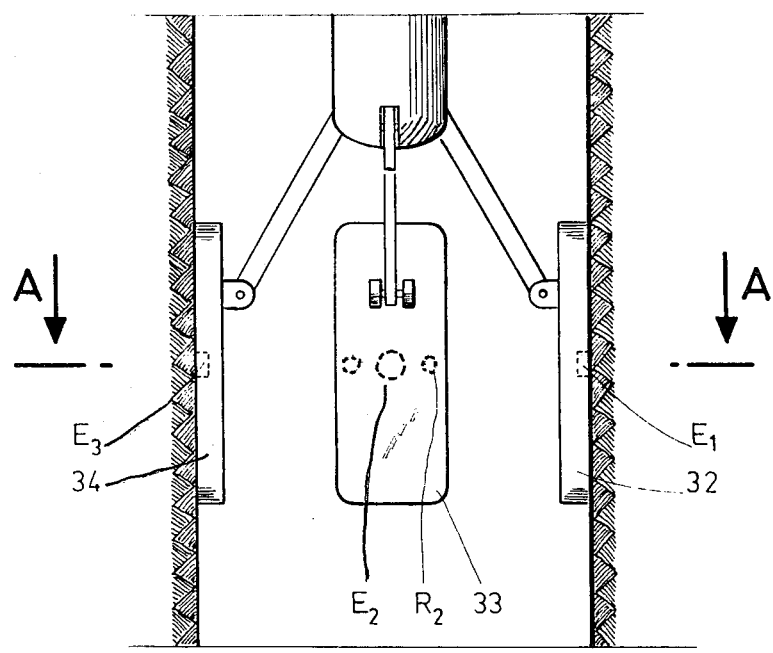
Figure 6A:
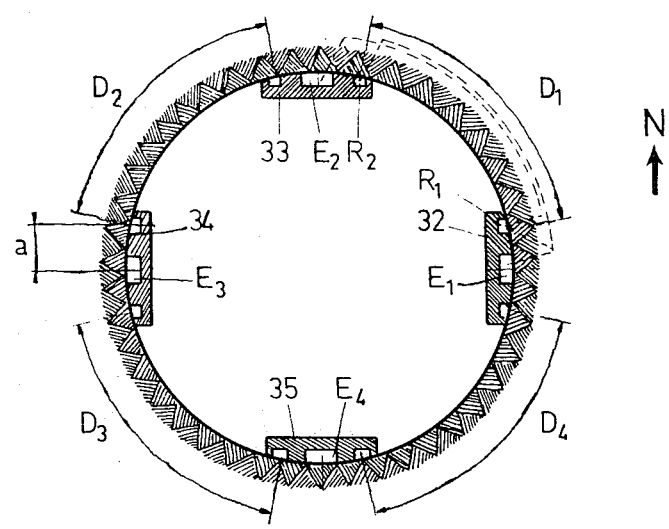
Figure 8:
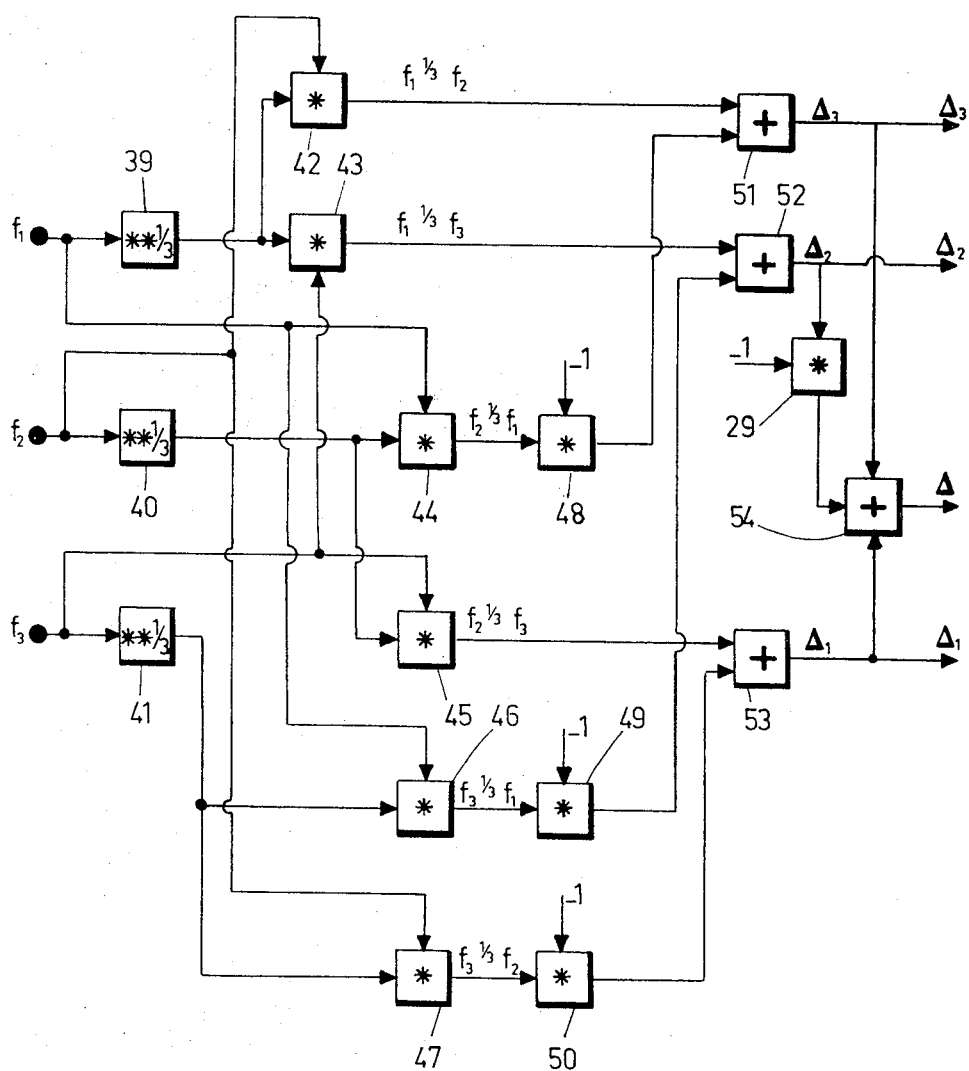
Figure 9:
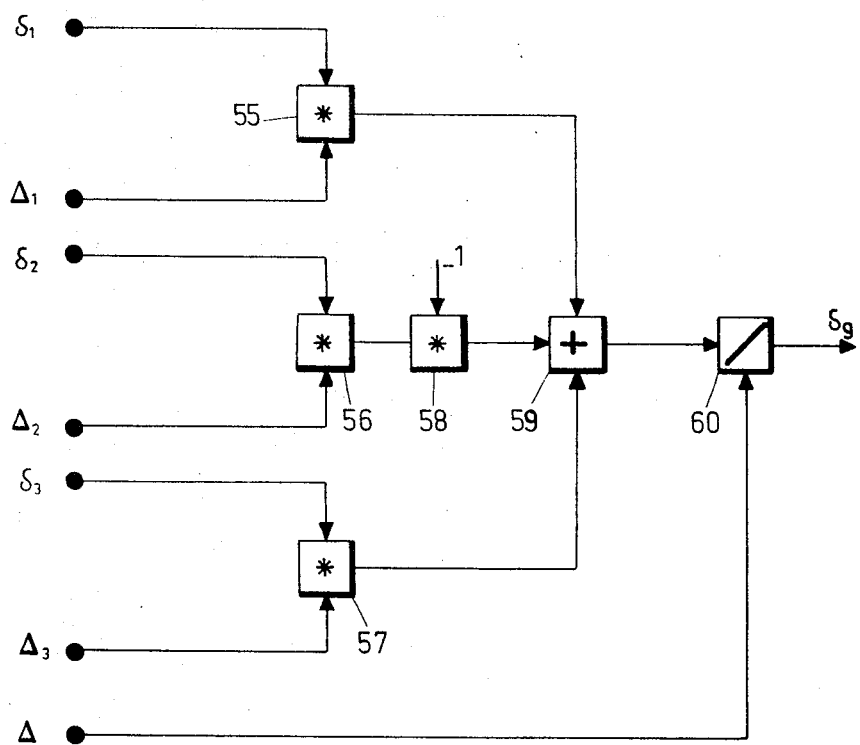
Figure 10:
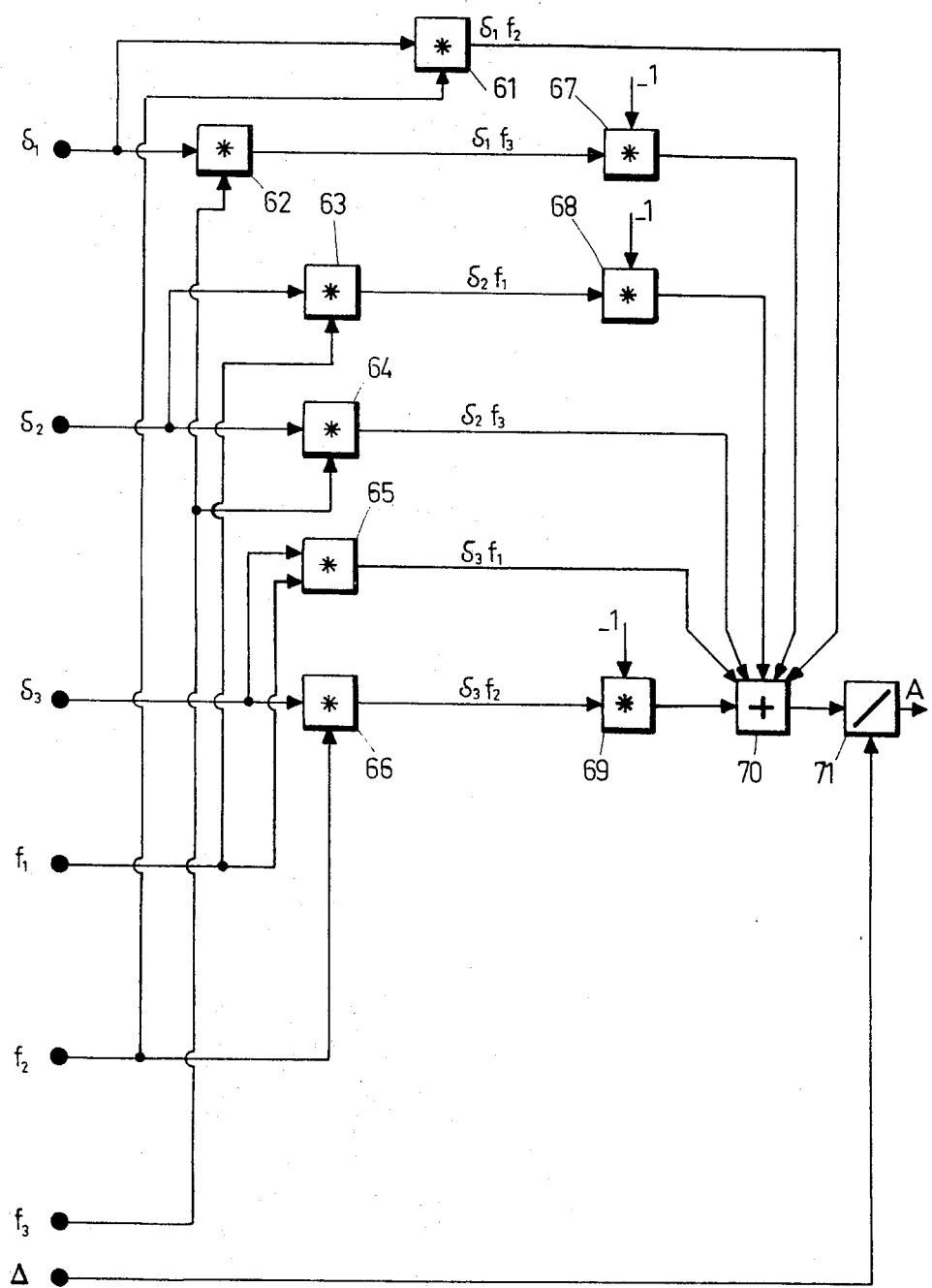
Figure 11:
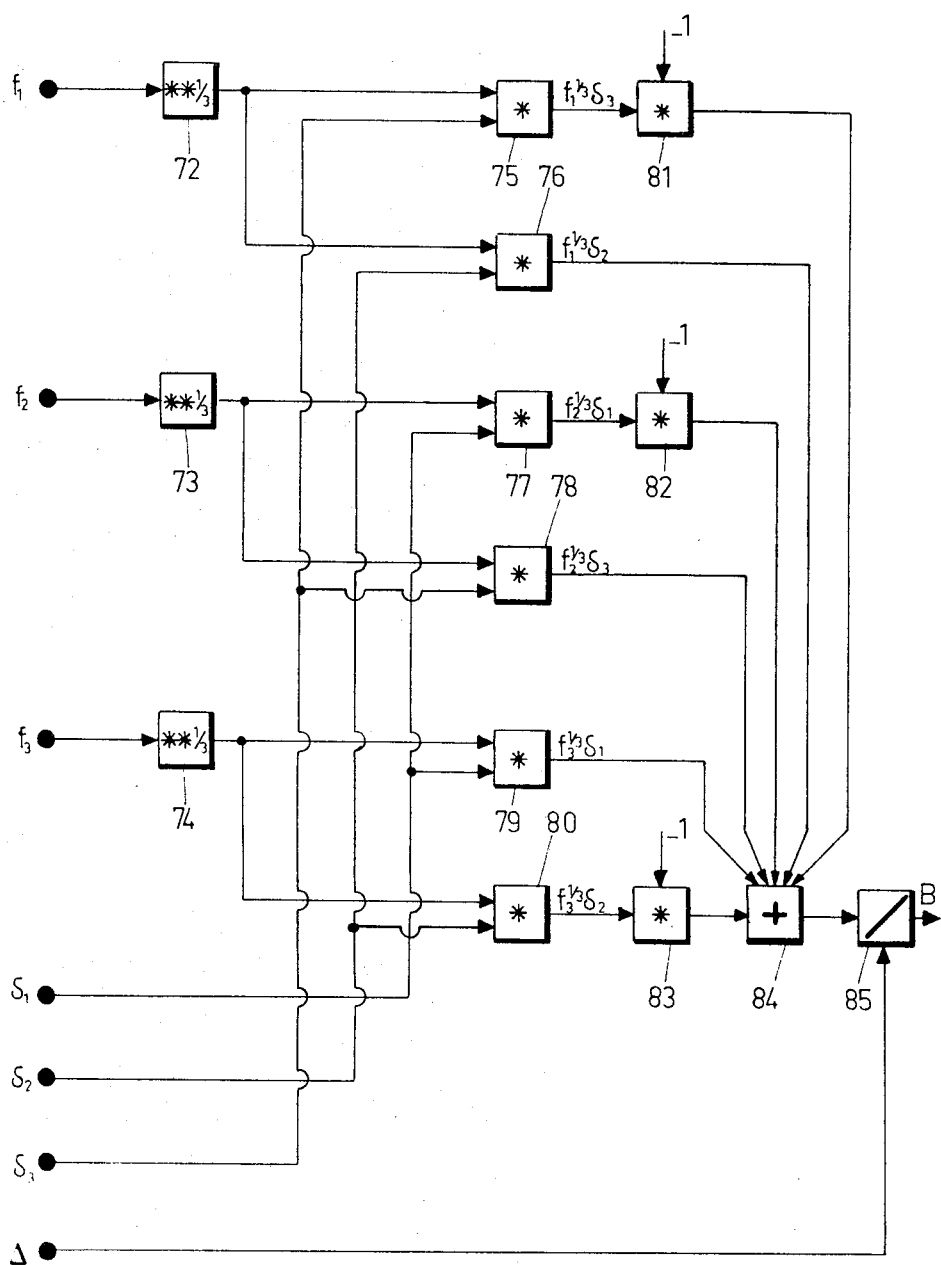

Non-limitative embodiments of the invention, wherein the transmission means are placed in a sonde lowered in a borehole, are illustrated by the accompanying drawings, wherein FIG. 1 illustrates a first embodiment of a device according to the invention, FIG. 2 shows circuits for determining the attenuations $\delta_1$ and $\delta_2$ at the two transmission frequencies of this device, FIG. 3 represents the circuits for determining the values of parameters $\delta g$ and A from the values of $\delta_1$ and $\delta_2$ and of the transmission frequencies, FIG. 4 illustrates a second type of a sonde which can be used in a device according to the invention, FIG. 5 represents circuits associated to this second type of sonde and adapted to determine average values from performed measurements, FIG. 5 A represents another embodiment allowing comparative measurements along different generatrices of the borehole, FIG. 5 B is a cross-sectional view along line B—B of the sonde illustrated by FIG. 5 A, FIGS. 6 and 6 A are respectively an elevational view and a cross-sectional view along A—A, of a third embodiment of a sonde for carrying out the method of the invention, FIG. 6 B illustrates a type of sonde for carrying out measurements both in a horizontal plane, as the sonde of FIG. 6, and along vertical directions, as the sonde of FIG. 5 A, FIG. 7 shows a circuit associated to this third type of sonde for determining the spacing L between the receivers, FIG. 8 represents a block of circuits associated to this third type of sonde, FIG. 9 illustrates a block of circuits connected to the circuits of FIG. 8 and adapted to determine the value of the parameter $\delta_f$, FIG. 10 shows a block of circuits connected to the circuits of FIG. 8 and adapted to determine the value of the parameter A, FIG. 11 represents an assembly of circuits connected to the circuits of FIG. 8 and adapted to determine the value of the parameter B.

In FIG. 1, illustrating an embodiment of the invention, reference numeral 1 designates a sonde lowered in the borehole 2, at the lower end of a supporting cable 3, this sonde including conventional resilient centering means 4 and 5. At the ground surface, the cable 3 is wound on a winch 6 (right side of FIG. 1, at a reduced scale).

In this embodiment the sonde comprises two transmitters of acoustic signals $E_1$ and $E_2$ having different transmission frequencies $f_1$ and $f_2$, for example $f_1 = 20$ kHz and $f_2 = 30$ kHz. These transmitters transmit signals sequentially. Each signal, after having traversed the geological formations surrounding the borehole, is picked up in two wide-band receivers $R_1$ and $R_2$, which are placed at a vertical distance L from each other.

Transmitters and receivers are located in recesses provided in support-members made of a material strongly absorbing the acoustic signals, the transmission and the reception of the signals being effected through windows of these supportmembers.

A set of baffles separating the transmitter from the receivers prevents any direct passage of the acoustic signals through the body of the sonde.

Such an arrangement of the sonde body is conventional and needs not therefore to be describe in detail.

The electric current is supplied to the transmitters $E_1$ and $E_2$ and the receivers $R_1$ and $R_2$ from a current source 7 placed on the ground surface, through a cable 8.

The reception at $R_1$ and $R_2$ of an acoustic signal transmitted from $E_1$ at the frequency $f_1$ results in the production of signals $(V_1)_{f_1}$ and $(V_2)_{f_1}$ respectively at the output terminals of these receivers, these signals being transmitted to the ground surface through cable 9 to a data processing device 10 to be described hereinunder.

Similarly, the transmission through $E_2$ of an acoustic signal of frequency $f_2$ results in the production of signals $(V_1)_{f_2}$ and $(V_2)_{f_2}$ respectively at the output terminals of these receivers, these signals being transmitted to the ground surface through cable 9 to the data processing device 10.

The acoustic attenuation between the receivers $R_1$ and $R_2$ is defined as a function of the ratio $[(V_1)_{f_1}/(V_2)_{f_1}]^2$, if the transmission is effected at the frequency $f_1$ and as a function of the ratio $[(V_1)_{f_2}/(V_2)_{f_2}]^2$, if the transmission frequency is $f_2$.

These attenuations may be expressed in decibels in the form:

1. $\delta_1 = 20/L \log_{10} (V_1)_{f_1}/(V_2)_{f_1}$
    (attenuation at the frequency $f_1$ by length unit of the distance separating the receivers) and,
2. $\delta_2 = 20/L \log_{10} (V_1)_{f_2}/(V_2)_{f_2}$
    (attenuation at the frequency $f_2$ by length unit of the distance separating the receivers The device 20 houses a block of circuits which delivers signals representative of $\delta_1$ and $\delta_2$.

As illustrated in FIG. 2, the signals representing the modulus of $(V_2)_{f_1}$ and $(V_1)_{f_1}$ are applied to circuits 11 and 12 respectively which deliver signals representative of the values of $\log_{10}(V_2)_{f_1}$ and $\log_{10}(V_1)_{f_1}$, which are applied to multiplying circuits (circuits 13 and 14) which deliver signals representative of the products 20 $\log_{10}(V_1)_{f_1}$ and $-20 \log_{10}(V_2)_{f_1}$ respectively.

These signals are applied to an adding circuit 15 which produces a signal representative of the values of $$20 [\log_{10}(V_1)_{f_1} - \log_{10}(V_2)_{f_1}]$$

This signal is applied to a dividing circuit 16 which delivers a signal representative of $$20/L [\log_{10}(V_1)_{f_1} - \log_{10}(V_2)_{f_1}]$$

(L having the above-indicating meaning), i.e., of the attenuation $\delta_1$ at the transmission frequency $f_1$.

Similar circuits, illustrated at the lower part of FIG. 2, deliver a signal representative of the attenuation $\delta_2$ at the transmission frequency $f_2$, from signals representative of the modulus of $(V_1)_{f_2}$ and $(V_2)_{f_2}$.

When the section of the borehole 2 is very irregular, as illustrated in FIG. 4, it will be advantageous to make use of a sonde with four transmitters $E_1'$, $E_2'$ and $E_1''$, $E_2''$, placed symmetrically two by two on both sides of receivers such as $R_1$ and $R_2$, two of these transmitters $E_1'$ and $E_1''$ transmitting signals at the frequency $f_1$ and the two others $E_2'$ and $E_2''$ transmitting signals at the frequency $f_2$.

Thus for each transmission frequency, for example the frequency $f_1$, two signals $(V_1')_{f_1}$ and $(V_1'')_{f_1}$ are picked up at the receiver $R_1$, these signals corresponding respectively to the transmission from $E_1'$ and to the transmission from $E_1''$ and two signals $(V_2')_{f_1}$ and $(V_2'')_{f_1}$ are picked up at the receiver $R_2$.

By means of circuits such as those illustrated by FIG. 2, there is determined, from the signals $(V_1')_{f_1}$ and $(V_2')_{f_1}$, the attenuation $\delta_1'$, between $R_1$ and $R_2$, of the signal at the frequency $f_1$ transmitted from $E_1'$, and from the signals $(V_1'')_{f_1}$ and $(V_2'')_{f_1}$ the attenuation $\delta_1''$, between $R_1$ and $R_2$, of the signal at the frequency $f_1$ transmitted from $E_1''$.

There is subsequently determined the average value $\delta_1$ of these two signals representing the average value of the attenuation at the transmission frequency $f_1$.

The signal $\delta_1$ is obtained (FIG. 5) by applying the two signals $\delta_1'$ and $\delta_1''$ to an adding circuit 17 whose output is connected to a circuit 18 dividing by 2.

In the same manner as for signals $\delta_1'$ and $\delta_1''$ there are determined signals $\delta_2'$ and $\delta_2''$ representing the attenuation between $R_1$ and $R_2$ of signals at the frequency $f_2$ transmitted by $E_2'$ and $E_2''$ respectively.

Then, as shown at the lower part of FIG. 5, there is produced the signal $\delta_2$ representing the average value of the attenuation at the transmission frequency $f_2$.

In practice, the value $\delta_1'$ of the attenuation, measured by using acoustic signals travelling downwardly in the vicinity of the borehole wall, is greater than the value $\delta_1''$ measured by using acoustic signals travelling upwardly, which can be explained since in the case of an upward propagation, the effect of the unevenness or irregularity of the borehole wall is added to the effect of the attenuation of the signals resulting from their propagation through the geological formations, in the vicinity of the borehole wall.

By using conventional non-illustrated means, it will be possible to produce a signal $R_1$ representative of the difference $\delta_1' - \delta_1''$, $$R_1 = \delta_1' - \delta_1''$$

The value of this signal is a function of the roughness, i.e., of the surface irregularities of the wall portion between the receivers $R_1$ and $R_2$.

This value having thus been obtained for the transmission frequency $f_1$, it will be possible to test the good operation of the apparatus by ascertaining that the value of $$R_2 = \delta_2' - \delta_2''$$

obtained for the transmission frequency $f_2$ is substantially equal to that of $R_1$, since the measured roughness is a characteristic of the borehole wall and must consequently be independent of the transmission frequency.

By using a sonde like that illustrated by FIG. 4 it is thus possible to disregard the differences between the paths followed by the signals in the mud surrounding the sound depending on the reception of these signals by $R_1$ or $R_2$, if there is a variation in the section of the borehole between these two receivers, as indicated in 19 in FIG. 4.

The attenuations $\delta_1$ and $\delta_2$ can be expressed in a first approximation as follows:

$$\delta_1 = \delta g + A f_1^{1/3} \qquad 3.$$

$$\delta_2 = \delta g + A f_2^{1/3} \qquad 4.$$

wherein $\delta g$ is a term independent of the transmission frequency of the acoustic signals, this term depending of the stratification and of the degree of fracturation of the formations traversed by the acoustic signals and A a coefficient of the form $$(4bias)\ A = K^{1/3} S \rho / \eta^{1/3} \phi$$

S being the specific area of the geological formation at the level of which the sonde is located, $\rho$ the specific gravity of the fluid impregnating this formation, $\eta$ the dynamic viscosity of this fluid, $\phi$ the porosity, and K the permeability of the formation.

The device according to the invention includes in the considered example of embodiment, an assembly of electric circuits (illustrated in FIG. 3), permitting the determination of $\delta g$ and A on the basis of the above-indicated relationships (3) and (4).

It can be deduced from these relationships:

$$\delta_g = (\delta_2 f_1^{1/3} - \delta_1 f_2^{1/3})/(f_1^{1/3} - f_2^{1/3})$$

$$5.$$

$$A = (\delta_1 - \delta_2)/(f_1^{1/3} - f_2^{1/3})$$

$$6.$$

The signals representative of $\delta_1$ and $\delta_2$, issuing from the circuits of FIG. 2, are applied to a summing circuit 20 (FIG. 3), the signal $\delta_2$ having first passed through a circuit 21 for reversing its polarity. The signal representative of the difference $\delta_1 - \delta_2$, delivered by the circuit 20 is applied to a first input terminal of a dividing circuit 22.

Signals representative of the values of the two transmission frequencies $f_1$ and $f_2$ pass through circuits 23 and 24 for elevation to the power ⅓, the signal issuing from the circuit 23 being applied to a polarity reversing circuit 25.

The signal delivered by the circuits 24 and 25 are applied to an adding circuit 26 which thus delivers a signal representative of $f_1^{1/3} - f_2^{1/3}$ and which is applied to the second input terminal of the dividing circuit 22, the latter delivering, under these conditions, a signal representative of:

$$A = (\delta_1 - \delta_2)/f_1^{1/3} - f_2^{1/3})$$

The signals representative of the attenuations $\delta_1$ and $\delta_2$ are further applied to multiplying circuits 27 and 28 which thus receive respectively the output signals of circuits 25 and 24.

The circuits 27 and 28 thus produce signals representative of $-\delta_1 f_2^{1/3}$ and $\delta_2 f_1^{1/3}$, respectively.

These signals are applied to an adding circuit 30 which thus delivers a signal representative of $$+ \delta_2 f_1^{1/3} - \delta_1 f_2^{1/3}$$

This signal is introduced into a dividing circuit 31 which also receives the output signal of circuit 26. This dividing circuit 31 thus delivers a signal representative of $$\delta g - (\delta_2 f_1^{1/3} - \delta_1 f_2^{1/3})/(f_1^{1/3} - f_2^{1/3})$$

Instead of using transmitters which transmit signals travelling through the ground parallelly to one and the same generatrix of the borehole, it will be possible, without departing from the scope of the present invention, to use transmitters, such as $E_1'''$ and $E_2'''$ (FIG. 5 A) having the axis of the sonde as symmetry axis, i.e., transmitting acoustic signals in all directions from this axis, in combination with a plurality of pairs of receivers, such as $(R_1, R_2), (R_1', R_2')$ . . . etc, respectively placed along different generatrices of the sonde.

FIGS. 5 A and 5 B illustrate an embodiment with four pairs of receivers.

From the measurements of parameters such as $\delta g$ and A effected parallelly to different generatrices of the borehole, it will be possible by comparing the different measuring values obtained along the different vertical paths, to determine the inhomogeneity of the geological formation.

FIGS. 6 and 6 A illustrate another type of sonde adapted to carry out the invention. This sonde includes acoustic transmitters such as $E_1$, $E_2$ and receivers, such as $R_1$, $R_2$ spaced from each other in the same horizontal plane, these transmitters and receivers being carried by pads 32 to 35 of the sonde. Such a sonde permits to measure the attenuation $$\delta_1' = 20/L \ (\log_{10}(V_1)f_1/\log_{10}(V_2)f_2),$$ between the receivers $R_1$ and $R_2$, of the acoustic signals at the frequency $f_1$ transmitted by transmitters such as $E_1$ and the attenuation $$\delta_2' = 20/L \ (\log_{10}(V_2)f_2/\log_{10}(V_1)f_1)$$

between the receivers $R_2$ and $R_1$, of the acoustic signals at the frequency $f_2$ transmitted by transmitters such as $E_2$. In these formulae L is the distance between the receivers $R_1$ and $R_2$, this distance being defined more accurately in the following.

This sonde thus permits to study the attenuation of the acoustic signals travelling in plane perpendicular to the borehole axis, all around the latter, whereas the above-described sondes allow the determination of signals propagated in a direction parallel to the borehole axis.

In the above indicated formulae, $(V_1)_f$ and $(V_2)_f$ represent, as for the device of FIG. 1, the signals appearing at the terminals of $R_1$ and $R_2$ respectively, in response to the transmission of an acoustic signal at the frequency $f_1$ by the transmitter $E_1$ and $(V_1)_f$, $(V_2)_f$ represent the signals which are obtained when an acoustic signal is transmitted by transmitter $E_2$.

The determination of the attenuation $\delta_1'$ and $\delta_2'$ with a sonde of the type illustrated by FIGS. 6 and 6 A will be carried out with circuits such as those illustrated by FIG. 2, in which however the input terminals for the signals $(V_1)_f$ and $(V_2)_f$ are exchanged.

The signals $\delta_1'$ and $\delta_2'$ will be applied to an assembly of circuits, such as that illustrated in FIG. 3, in lieu of signals $\delta_1$ and $\delta_2$ in the above-described embodiment.

In this embodiment of the sonde, the value of the distance L between the acoustic receivers $R_1$ and $R_2$, introduced into the circuits such as 16 (FIG. 2), is given by the formula $L = (\pi D/4) - 2a$, wherein D represents the diameter of the borehole and $a$ the distance between the transmitter $E_1$ and the receiver $R_1$.

A signal representative of the value of L can be generated in an auxiliary circuit of the type illustrated by FIG. 7 wherein the values of D and $a$ are introduced through circuits multiplying by $\pi/4$ and $-2$ respectively (circuits 36 and 37), the output signals of these circuits being applied to an adding circuit 38 which delivers a signal representative of $(\pi D/4) - 2a = L$.

In the embodiment illustrated by FIGS. 6 and 6 A, four transmitters $E_1$, $E_2$, $E_3$ and $E_4$ are regularly distributed over the periphery of the sonde, the transmitters $E_1$ and $E_3$ having the same transmission frequency $f_1$ and the transmitters $E_2$ and $E_4$ having the same transmission frequency $f_2$. To each of these transmitters are associated two receivers, such as $R_1$ and $R_2$.

Through sequential transmission of the different transmitters it becomes possible to determine the values of parameters such as $\delta g$ and A along four horizontal paths $D_1$, $D_2$, $D_3$ and $D_4$, each of which represents slightly less than one quarter of circle and whose position with respect to the geographical North (indicated by the arrow N in FIG. 6 A) can be fixed by any known device for orienting the sonde.

It will thus be possible to determine four values $\delta g_1$, $\delta g_2$, $\delta g_3$ and $\delta g_4$ of $\delta g$ and four values $A_1$, $A_2$, $A_3$ and $A_4$ for the four paths $D_1$, $D_2$, $D_3$ and $D_4$ respectively.

In view of the fact that parameter $\delta g$ gives an information on the degree of fracturation of the geological formation, measurements of ratios such as $\delta g_1/\delta g_3$, $\delta g_2/\delta g_4$, which can be performed by means of dividing circuits of known types, will permit to characterize respectively the variation of the degree of fracturation along the directions north-east/south-west and north-west/south-east respectively and the measurement of the ratio $(\delta g_1 + \delta g_3)/(\delta g_2 + \delta g_4)$ will permit a characterization of the anisotropy of the fracturation in a horizontal plane.

It will of course be possible to combine (FIG. 6 B) the types of sondes illustrated by FIGS. 1 and 6, by using on each pad at least two acoustic transmitters, such as $E_1$ and $e_2$ and two receivers, such as $r_1$ and $r_2$, thus permitting comparative measurements of characteristics such as $\delta g$ and A of the geological formations, both in the horizontal plane of the transmitters $E_1$, $E_2$, $E_3$ and $E_4$ and parallelly to at least one generatrix of the borehole wall.

According to another embodiment of the invention, there is provided on a sonde which may for example be of the type shown by FIG. 1, a third transmitter $E_3$ (not shown), which, by way of example, will be supposed to be located between the transmitter $E_2$ and the receiver $R_1$, this transmitter operating at a frequency $f_3$ different from the frequencies $f_1$ and $f_2$.

By comparison with the results obtained with the sonde of FIG. 1, it appears now that three coefficients of attenuation can be determined, whose respective values in decibels are:

$$\delta_1 = (20 \log (V_1/V_2))_f \quad 7.$$

$$\delta_2 = (20 \log (V_1/V_2))_f \quad 8.$$

$$\delta_3 = (20 \log (V_1/V_2))_f \quad 9.$$

Three circuits identical to that illustrated in FIG. 2 will permit the determination of $\delta_1$, $\delta_2$ and $\delta_3$ $$\delta_1 = \delta_g + A f_1^{1/3} + B f_1 \quad 5.$$

$$\delta_2 = \delta_g + A f_2^{1/3} + B f_2 \quad 6.$$

$$\delta_3 = \delta_g + A f_3^{1/3} + B f_3 \quad 7.$$

The parameters $\delta g$ and A have been defined hereinabove B is a parameter representative of the degree of compactness of imperviousness of the formations traversed by the acoustic signals.

These three parameters are functions of the transmission frequencies $f_1$, $f_2$ and $f_3$ and of the determinant $\Delta$ of the system of equations formed by the relations (5), (6) and (7).

$\Delta$ is given by the following relation $$\Delta = \Delta_1 - \Delta_2 + \Delta_3 \quad 8.$$

assuming $$\Delta_1 = f_2^{1/3} f_3 - f_3^{1/3} f_2 \quad 9.$$

$$\Delta_2 = f_1^{1/3} f_3 - f_3^{1/3} f_1 \quad 10.$$

$$\Delta_3 = f_1^{1/3} f_2 - f_2^{1/3} f_1 \quad 11.$$

The expressions of $\delta g$, A and B are the following $$\delta g = [\delta_1(f_2^{1/3} f_3 - f_3^{1/3} f_2) - \delta_2(f_1^{1/3} f_3 - f_3^{1/3} f_1) + \delta_3(f_1^{1/3} f_2 - f_2^{1/3} f_1)]/\Delta \quad 12.$$

$$A = [(\delta_2 f_3 - \delta_3 f_2) + (\delta_3 f_1 - \delta_1 f_3) + (\delta_1 f_2 - \delta_2 f_1)]/\Delta \quad 13.$$

$$B = [(f_2^{1/3}\delta_3 - f_3^{1/3}\delta_2) + (f_3^{1/3}\delta_1 - f_1^{1/3}\delta_3) + (f_1^{1/3}\delta_2 - f_2^{1/3}\delta_1)]/\Delta \quad 14.$$

FIG. 8 illustrates circuits which can be used in combination with a sonde having three transmitters and two receivers, for generating a signal representative of the above-defined determinant $\Delta$.

Signals representative of the values of the transmission frequencies $f_1$, $f_2$ and $f_3$ are applied to circuits (39, 40, 41) for rising at the power ⅓. The signal delivered by the circuit 39 is applied to the multiplying circuits 42 and 43 which also receive signals representative of the frequencies $f_2$ and $f_3$.

The signal delivered by the circuit 40 is applied to mulitplying circuits 44 and 45 which also receive signals representative of the frequencies $f_1$ and $f_3$.

Similarly the signal delivered by circuit 41 is applied to the multiplying circuits 46 and 47 which also receive respectively signals representative of the frequencies $f_1$ and $f_2$.

The signals emanating from the circuits 44, 46 and 47 are applied to polarity reversing circuits 48, 49 and 50 respectively.

Consequently the circuits 42 and 48 deliver signals representative of $f_1^{1/3}f_2$ and of $-f_2^{1/3}f_1$ respectively. These signals are applied to an adding circuit 51 which delivers a signal representative of the value $$f_1^{1/3}f_2 - f_2^{1/3}f_1 = \Delta_3$$

The circuits 43 and 49 deliver signals representative of $f_1^{1/3}f_3$ and $-f_3^{1/3}f_1$ respectively.

These signals are applied to an adding circuit 52 which delivers a signal representative of the value $$f_1^{1/3}f_3 - f_3^{1/3}f_1 = \Delta_2$$

Similarly the circuits 45 and 50 deliver signals representative of $f_2^{1/3}f_3$ and of $-f_3^{1/3}f_2$ respectively.

These signals are applied to an adding circuit 53 which delivers a signal representative of the value:

$$f_2^{1/3}f_3 - f_3^{1/3}f_2 = \Delta_1$$

The signal produced by the circuit 52 is applied to a polarity reversing circuit 29 which produces a signal $-\Delta_2$.

The signals delivered by the adding circuits 51, 53 and the polarity reversing circuit 29 are applied to an adding circuit 54 which produces a signal representative of the value of the above-defined determinant $\Delta$.

FIG. 9 diagrammatically shows a block of circuits permitting the determination of the value of the component $\delta g$ of the acoustic attenuation.

Signals representative of $\delta_1$ and $\Delta_1$, supplied by the above-described circuits (the signal $\Delta_1$ is supplied by the circuit 53 of FIG. 8) are applied to a multiplying circuit 55 which delivers a signal representative of the value of the product $\delta_1 \Delta_1$.

Similarly a multiplying circuit 56 delivers a signal representative of the value of the product $\delta_2 \Delta_2$, the polarity of this signal being reversed through the circuit 58 connected to the output of circuit 56.

The multiplying circuit 57 delivers a signal representative of the value of the product $\delta_3 \Delta_3$.

The signals delivered by the circuits 55, 58 and 57 are applied to an adding circuit 59 which delivers a signal representative of $$\delta_1 \Delta_1 - \delta_2 \Delta_2 + \delta_3 \Delta_3$$

This signal is introduced into the dividing circuit 60 which also receives a signal representative of the values of $\Delta$, delivered by the circuit 54.

The circuit 60 delivers a signal representative of the value of the ratio $$(\delta_1 \Delta_1 - \delta_2 \Delta_2 + \delta_3 \Delta_3)/\Delta$$

i.e. of $\delta g$

FIG. 10 diagrammatically illustrates a block of circuits delivering a signal representative of the value of the above-defined parameter A.

A signal representative of the value of $\delta_1$ is applied to two multiplying circuits 61 and 62 in parallel, these circuits further receiving a signal representative of the value of the frequency $f_2$ and a signal representative of the value of the frequency $f_3$.

Consequently, the circuits 61 and 62 deliver respectively a signal representative of the value $\delta_1 f_2$ and a signal representative of the value $\delta_1 f_3$.

Similarly, a signal representative of the value $\delta_2$ is applied to two multiplying circuits 63 an 64 in parallel, these circuits further receiving respectively a signal representative of the value of the frequency $f_1$ and a signal representative of the value of the frequency $f_3$.

The circuits 63 and 64 thus deliver respectively a signal representative of the value of $\delta_2 f_1$ and a signal representative of the value of $\delta_2 f_3$.

A signal representative of the value of $\delta_3$ is applied to two multiplying circuits 65 and 66 in parallel, these circuits further receiving respectively a signal representative of the value of the frequency $f_1$ and a signal representative of the value of the frequency $f_2$.

The circuits 65 and 66 thus deliver respectively a signal representative of the value $\delta_3 f_1$ and a signal representative of the value $\delta_3 f_2$.

The output signals of the circuits 62, 63 and 66 pass through polarity reversing circuits 67, 68 and 69 respectively.

The output signals of the circuits 61, 67, 68, 64, 65 and 69 are applied to an adding circuit 70 which thus produces a signal representative of $$\delta_2 f_3 - \delta_3 f_2 + \delta_3 f_1 - \delta_1 f_3 + \delta_1 f_2 - \delta_2 f_1$$

This signal is applied to a dividing circuit 71 which also receives a signal representative of the value of $\Delta$, supplied by the circuit 54 of FIG. 8.

Consequently, the dividing circuit 71 delivers a signal representative of the value of the ratio $$(\delta_2 f_3 - \delta_3 f_2 + \delta_3 f_1 - \delta_1 f_3 + \delta_1 f_2 - \delta_2 f_1)/\Delta$$

i.e., of the value of the above-defined parameter A.

FIG. 11 diagrammatically illustrates an assembly of circuits whereby is obtained a signal representative of the value of the above-defined parameter B.

Signals representative of the respective values of the transmission frequencies $f_1, f_2$ and $f_3$ are applied to circuits rising at the power ⅓ (circuits 72, 73 and 74 respectively).

The signal representative of $f_1^{1/3}$, delivered by the circuit 72 is applied to the two multiplying circuits 75 and 76 in parallel, these two circuits further receiving respectively a signal representative of the value of $\delta_3$ and a signal representative of the value of $\delta_3$. Consequently, the circuits 75 and 76 deliver two signals which are respectively representative of the value of $f_1^{1/3}\delta_3$ and of $f_1^{1/3}\delta_2$.

Similarly the signal representative of $f_2^{1/3}$, delivered by the circuit 73 is applied to the two multiplying circuits 77 and 78 in parallel, these two circuits also receiving a signal representative of the value of $\delta_1$ and a signal representative of the value of $\delta_3$. The circuits 77 and 78 deliver two signals which are respectively representative of the values $f_2^{1/3}\delta_1$ and $f_2^{1/3}\delta_3$.

The multiplying circuits 79 and 80 produce similarly two signals representative of the values $f_3^{1/3}\delta_1$ and $f_3^{1/3}\delta_2$ respectively.

The signals delivered by the circuits 75, 77 and 80 are applied to polarity reversing circuits (circuits 81, 82 and 83 respectively).

The signals delivered by the circuits 81, 76, 82, 78, 79 and 83 are applied to an adding circuit 84 which delivers a signal representative of the value $$f_2^{1/3}\delta_3 - f_3^{1/3}\delta_2 + f_3^{1/3}\delta_1 - f_1^{1/3}\delta_3 + f_1^{1/3}\delta_2 - f_2^{1/3}\delta_1$$

This signal is applied to a dividing circuit 83 which also receives a signal representative of the value $\Delta$, supplied by the circuit 54 of FIG. 8.

Consequently the dividing circuit 85 delivers a signal representative of the value of the quotient $$(f_2^{1/3}\delta_3 - f_3^{1/3}\delta_2 + f_3^{1/3}\delta_1 - f_1^{1/3}\delta_3 + f_1^{1/3}\delta_2 - f_2^{1/3}\delta_1)/\Delta$$

i.e., of the value of the above coefficient B.

What I claim is:

1. A method for determining characteristics of a geological formation using data processing means, this method comprising the steps of transmitting acoustic signals through the studied geological formation, this signal travelling through the formation, measuring the attenuation of these signals between two points spaced from each other along the direction of propagation of these signals, this attenuation being a function $\delta$ of the logarithm of the ratio of the squares of the amplitudes of the signals appearing at said two points respectively, expressed by the relationship:

$$\delta = \delta g + Af^{1/3} + Bf + Cf^2 + N_1 f^3 + N_2 f^4 + \ldots + N_i f^{i+2}$$

wherein $\delta g$ is the geometrical attenuation factor which depends, in particular, on the degree of fracturation of the formation, A is the attenuation coefficient due to the movement of flow of the fluids through the pores of the formation and which depends on characteristic parameters of the porous medium and on the fluids impregnating the same, B is the attenuation coefficient due to the frictions between solids during the propagation of the acoustic signals, C represents the attenuation coefficient due to the frictions between fluids, the series of the terms $N_1 f^3, N_2 f^4 \ldots N_i f^{i+2}$ represents all the attenuation factors which are respectively functions of $f^3, f^4 \ldots f^{i+2}$, $f$ being the frequency of the transmitted signals, the method further comprising the steps of transmitting signals, having at least two frequencies $f_1, f_2 \ldots f_{i+4}$, the number of the transmission frequencies being at least equal to the number of parameters $\delta g, A, B, C, N_1 \ldots N_i$ to be determined, measuring the attenuation $\delta_1, \delta_2 \ldots \delta_{i+4}$ of the signals between said two points spaced from each other along the direction of propagation of the acoustic signals for each of said transmission frequencies, and determining, through said data processing means, the values of at least the two first of said parameters $\delta g$, A, B and C complying with the relationships:

$$\delta_1 = \delta_g + Af_1^{1/3} + Bf_1 + Cf_1^2 + N_1f_1^3 + \ldots + N_if_1^{i+2}$$

$$\delta_2 = \delta_g + Af_2^{1/3} + Bf_2 + Cf_2^2 + N_1f_2^3 + \ldots + N_if_2^{i+2}$$

$$\delta_{i+4} = \delta_g + Af_{i+4}^{1/3} + Bf_{i+4} + N_1f_{i+4}^3 + \ldots + N_if_{i+4}^{i+2}$$

the values of B, C, $N_1 \ldots N_i$ being considered as equal to zero when only two frequencies are used for the transmission and the values of C, $N_1 \ldots N_i$ being considered as equal to zero when the number of transmission frequencies is equal to three.

2. A device for determining characteristics of a geological formation comprising in combination means for transmitting signals in the studied geological formation, these signals travelling through the formations, means for measuring the attenuation of these signals between two points spaced from each other along the direction of propagation of these signals, this attenuation being a function $\delta$ of the logarithm of the ratio of the squares of the amplitudes of the signals appearing at said two points respectively, expressed as follows:

$$\delta = \delta_g + Af^{1/3} + Bf + Cf^2 + N_1f^3 + N_2f^4 + \ldots N_if^{i+2}$$

wherein $\delta g$ is the geometrical attenuation factor which depends, in particular, on the degree of fracturation of the formation, A is the attenuation coefficient due to the movement or flow of the fluids through the pores of the formation and which depends on characteristic parameters of the porous medium and of the fluids impregnating the same, B is the attenuation coefficient due to the frictions between solids during the propagation of the acoustic signals, C represents the attenuation coefficient due to the frictions between fluids, the series of the terms $N_1f^3, N_2f^4, \ldots, N_if^{i+2}$ represents all the attenuation factors which are respectively functions of $f^3, f^4 \ldots f^{i+2}$, $f$ being the frequency of the transmitted acoustic signals, said transmission means having at least two transmission frequencies $f_1, f_2 \ldots f_{i+4}$, the number of the transmission frequencies being at least equal to the number of parameters $\delta g$, A, B, C, $N_1 \ldots N_i$ to be determined, said data processing means being adapted to determine the values of at least the two first of said parameters $\delta g$, A, B, and C complying with the relationships:

$$\delta_1 = \delta_g + Af_1^{1/3} + Bf_1 + Cf_1^2 + N_1f_1^3 + \ldots + N_if_1^{i+2}$$

$$\delta_2 = \delta_g + Af_2^{1/3} + Bf_2 + Cf_2^2 + N_1f_2^3 + \ldots + N_if_2^{i+2}$$

$$\delta_{i+4} = \delta_g + Af_{i+4}^{1/3} + Bf_{i+4} + Cf_{i+4}^2 + N_1f_{i+4}^3 + \ldots + N_if_{i+4}^{i+2}$$

$\delta_1, \delta_2 \ldots \delta_{i+4}$ being the attenuations measured for the transmission frequencies $f_1, f_2, \ldots f_{i+4}$ respectively, the values of B, C, $N_1 \ldots N_i$ being considered as equal to zero when only two frequencies are used for the transmission and the values of C, $N_1 \ldots N_i$ being considered as equal to zero when the number of transmission frequencies is equal to three.

3. A device according to claim 2, wherein said transmission means are constituted by at least two acoustic transmitters carried by a sonde and said means for measuring the attenuation comprises at least two acoustic receivers in spaced relationship from said transmitters, the attenuation being measured between said receivers.

4. A device according to claim 3, comprising means for determining the difference between the attenuations $$[(\delta_1' - \delta_1'') \text{ or } (\delta_2' - \delta_2'')]$$

measured between said receivers when the transmission is effected at one and the same transmission frequency ($f_1$ or $f_2$) said first and said second transmitters respectively, said difference being representative of the roughness of the portion of the borehole wall comprised between said two receivers.

5. A device according to claim 2, comprising at least two receivers spaced from each other in the direction of elongation of said sonde.

6. A device according to claim 2, comprising a plurality of acoustic transmitters and receivers distributed over the periphery of the sonde.

7. A device according to claim 2, comprising at least one assembly of two couples of transmitters placed symmetrically with respect to two receivers, in the direction of elongation of the sonde, the transmitters of each of said couples having different transmission frequencies and the transmission frequencies being equal two by two for the transmitters of said two couples, said data processing means comprising means for determining the average value of the attenuations which are respectively measured when acoustic signals of the same frequency are transmitted from the transmitters of both couples of transmitters.

* * * * *

UNITED STATES PATENT OFFICE
CERTIFICATE OF CORRECTION

Patent No. 3781784      Dated December 25, 1973

Inventor(s) Robert Desbrandes

It is certified that error appears in the above-identified patent and that said Letters Patent are hereby corrected as shown below:

Title page, insert the following

[30]    Foreign Application Priority Data

July 8, 1971     France ............ EN/71/25,138

Signed and sealed this 2nd day of July 1974.

(SEAL)
Attest:

EDWARD M. FLETCHER, JR.
Attesting Officer

C. MARSHALL DANN
Commissioner of Patents